Dec. 29, 1931.   C. A. SABBAH   1,839,166
POWER CONVERTING APPARATUS
Filed July 8, 1929   2 Sheets-Sheet 1

Inventor:
Camil A. Sabbah,
by Charles E. Tullar
His Attorney.

Dec. 29, 1931.　　　C. A. SABBAH　　　1,839,166

POWER CONVERTING APPARATUS

Filed July 8, 1929　　2 Sheets-Sheet 2

Inventor:
Camil A. Sabbah,
by Charles N. Tullar
His Attorney

Patented Dec. 29, 1931

1,839,166

UNITED STATES PATENT OFFICE

CAMIL A. SABBAH, OF SCHENECTADY, NEW YORK, ASSIGNOR TO GENERAL ELECTRIC COMPANY, A CORPORATION OF NEW YORK

POWER CONVERTING APPARATUS

Application filed July 8, 1929. Serial No. 376,828.

My invention relates to power converting apparatus such as that utilized to transmit electric power between direct and alternating current circuits or between alternating current circuits operated at different frequencies, and has for its principal object the provision of an improved power converting apparatus which is not subject to the danger of short circuit heretofore encountered in the operation of such apparatus, which may be constructed at comparatively low cost and which operates with a high degree of efficiency.

My invention is similar in some respects to that disclosed by my Patent No. 1,752,205, issued March 25, 1930 and assigned to the same assignee as the present application, but differs therefrom in certain features whereby the operation of the apparatus is improved.

My invention will be better understood from the following description when considered in connection with the accompanying drawings and its scope will be pointed out in the appended claims.

Figure 1:
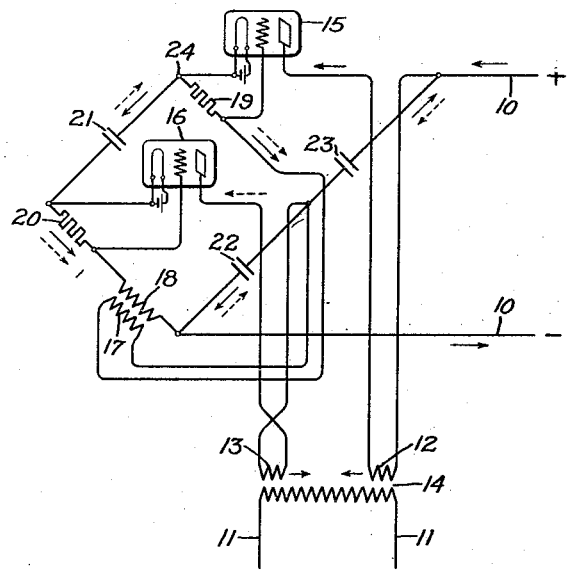
Figure 2:
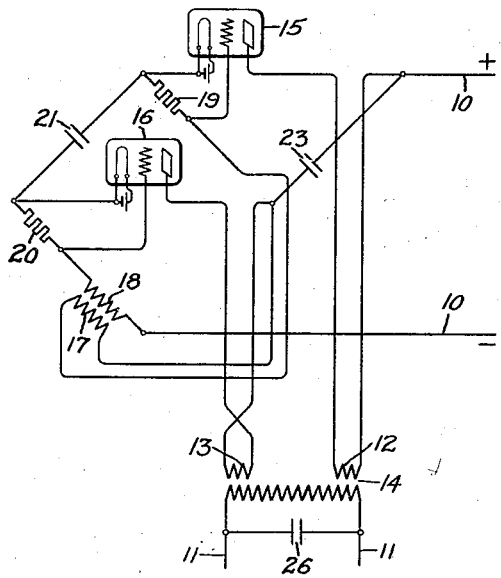
Figure 3:
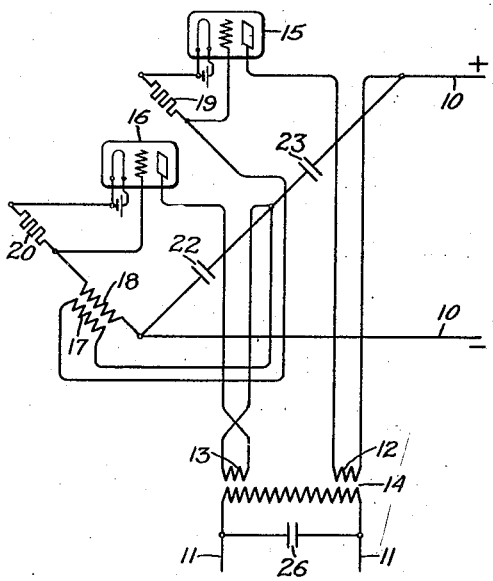
Figure 4:
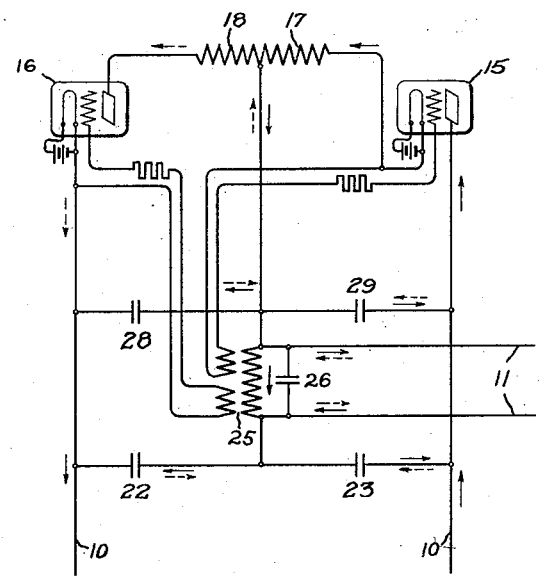

Referring to the drawings, Fig. 1 shows a converting apparatus wherein my invention has been embodied; and Figs. 2, 3 and 4 show different modifications of this apparatus.

The apparatus illustrated by Fig. 1 includes direct current terminals 10 and alternating current terminals 11. When the apparatus is utilized for the purpose of converting direct current to alternating current, power is supplied to the terminals 10 and delivered at the terminals 11. When the apparatus is utilized to rectify alternating current, power is supplied to the terminals 11 and is delivered at the terminals 10. The connections between these two pairs of terminals include the windings 12 and 13 of a transformer 14, a pair of electric valves 15 and 16, a pair of reactor devices 17 and 18, a pair of grid potential control resistors 19 and 20 and a plurality of capacitors 21, 22 and 23. It should be understood that the reactors 17 and 18 may be inductively related with one another for the purpose of controlling their impedance drop and that the operation of the system is not changed fundamentally if they are entirely separated from one another.

Assuming the apparatus to be transmitting power from direct current circuit terminals 10 to the alternating current circuit terminals 11, the direction of current flow to the various parts of the apparatus is indicated by the solid arrows. It will be noted that current flows from the positive side of the direct current line and from the capacitor 23 through the winding 12 and the valve 15 to the junction 24 where it divides, one part of it flowing through the capacitor 21, the resistor 20 and the reactor device 18 to the negative side of the direct current line, and the other part of it flowing through the resistor 19, the reactor 17 and the capacitor 22 to the negative side of the direct current line.

The valves 15 and 16 are preferably of the vapor electric ionization type but may be of any other suitable type and are subjected to a negative grid bias potential of a magnitude dependent on the voltage drop of the resistors 19 and 20. The manner in which direct current supplied at the terminals 10 is converted into alternating current delivered at the terminals 11, will be readily understood. During the time interval when the valve 15 carries current, the valve 16 is subjected to a voltage which is the sum of the reactor and capacitor voltages and increases in magnitude until the negative grid bias potential of the valve 16 has decreased to a value which permits the passage of current through the valve 16 and the winding 13. Due to this current the anode voltage of the valve 15 is reversed, the current of the valve 15 is interrupted, and the negative grid bias voltage of the valve 15 increases in value.

During a subsequent time interval, current is carried by the valve 16 which is now subjected to an anode voltage dependent on the difference between the reactor and capacitor voltages. At the same time, the valve 15 is subjected to an anode voltage which is dependent on the sum of the reactor and capacitor voltages and which increases until the negative grid potential has decreased to a value which permits current to start through the valve 15. When this current starts, the valve 16 is subjected to a negative anode voltage, its current is interrupted, and its grid and anode change in a manner to permit opening of the valve 16 and closure of the valve 15.

The frequency at which current is supplied at the alternating current circuit is dependent on the characteristics of the valves 15 and 16 and on the adjustment of the grid connections to the resistors 19 and 20. It is well known that valves of the vapor electric type may be so designed that they start to carry current either at zero grid potential or at a predetermined negative or positive grid potential. Assuming that the valves 15 and 16 begin to transmit current at a certain negative grid potential, it will be apparent that the operating frequency of the line 11 may be varied by including more or less of the resistors 19 and 20 in the respective grid circuits of the valves 15 and 16. Thus if the negative grid bias potential of the valves is increased, the operating frequency of the line 11 is raised and vice versa.

The apparatus just described is similar in its arrangement and mode of operation to that disclosed by the aforementioned patent except that an additional capacitor 23 is connected between the positive terminal of the direct current circuit and a terminal of the oscillatory circuit including the capacitors 21 and 22, the resistors 19 and 20 and the reactor devices 17 and 18. The inclusion of the capacitor 23 has the very important advantage that current is drawn from the direct current circuit continuously instead of only while the valve 15 is carrying current and that the wave form and regulation of the voltage applied to the alternating current circuits 11 is greatly improved.

It is evident that the capacitors 22 and 23 are connected in series between the direct current terminals 10. This connection has been found satisfactory for many purposes. In some cases, however, it may tend to produce undesirable fluctuations in the current of the direct current circuit. These fluctuations may be avoided by omitting the condenser 22 as indicated by Fig. 2 which illustrates what may be designated as a cross section. This apparatus operates in the same manner as those illustrated in Fig. 1 of the aforementioned patent and present application and like those apparatus has the advantage that failure of either of the valves 15 or 16 does not result in a destructive short circuit due to arc back when the apparatus is operated as a rectifier.

Thus if the valve 15 fails or is short circuited, the reactor coil 17 will receive current from valve 16 in one direction and current from valve 15 in the other, so that the resultant current of the reactor 17 will be inappreciable and the alternating current supply will only be supplying current throughout the circuit represented by the circuit including the capacitor 23, valve 15, capacitor 21 and valve 16 opposed by the impedance of capacitors 21 and 23. Under normal condition the impedance of these capacitors is equal and opposite to the impedance of reactor 17. Hence, the current flow would be the same as if the A. C. voltage were applied on reactor 17. Now considering the reactors 17 and 18 as a transformer, this reactance would be the magnitizing reactance of the transformer. Thus the current flowing in the circuit 23, 15, 21 and 16 would be equivalent to the exciting current of the transformer consisting of the windings 17 and 18.

When the apparatus is supplying power from the direct current to the alternating current circuit, a short across the terminals 10 is avoided. It will be assumed that the valve 15 is operating, that the capacitor 21 has been charged up to nearly twice the line voltage and capacitor 23 discharged to a voltage equal to zero or below, and that valve 16 starts operating before the current in valve 15 has gone down to zero. If means were not supplied for the almost instantaneous decay of the current in 15, the two valves would simply short out the D. C. supply. This is accomplished by the circuit consisting of 15, capacitor 21, valve 16 and capacitor 23. Thus the capacitor 21 will discharge through this circuit until the current of 15 has gone down to zero. The time during which this decay occurs depends on the conductivity of this circuit. Since this circuit includes the two valves, the arc drop of which is very small and the capacitors whose conductivity is infinite and the load which is shunted by capacitors such as a condenser 26 which also have a very high conductivity, this delay is small.

As indicated by Fig. 3, the capacitor 21 may be omitted without interfering in any way with the operation of the apparatus as disclosed in my aforesaid patent. Without this condenser the load voltage is somewhat lower and the wave form is less satisfactory.

The apparatus illustrated by Fig. 4 includes a pair of input terminals 10 and a pair of output terminals 11 which are interconnected through means including the capacitors 22 and 23 connected across the input circuit, a pair of capacitors 28 and 29 connected across the input circuit parallel with the capacitors 22 and 23 and the electric valves 15 and 16 which are connected to the input circuit through impedance devices 17 and 18.

The grid control potentials of the valves 15 and 16 are derived from a transformer 25 which includes a primary winding connected to the alternating current output circuit 11 and a pair of secondaries respectively connected between the cathode and grid of the valve 17 and the cathode and grid of the valve 16. A capacitor 26 may be connected across the alternating current output circuit 11 for purposes hereinafter explained. The condensers 28 and 29 are provided for the purpose of improving the wave form of the alternating current output potential and are not essential to satisfactory operation of the apparatus where a sine wave of alternating current output potential is not required.

The operation of the apparatus will be better understood if it be assumed that the valve 15 is conductive and a direct current voltage is applied to the terminals 10. Under these conditions current is transmitted from the right hand direct current terminal as indicated by the full line arrows. It will be observed that current flows from the condensers 23 and 29 to the valve 15, and from the valve 15 through the reactor 17 either to the condenser 28 or to the alternating current output circuit 11. From the alternating current circuit current flows through the condenser 22 to the left hand terminal of the direct current circuit. Due to the potential of the transformer 25 the valve 16 subsequently becomes conductive and the valve 15 is rendered non-conductive. When this occurs, current is supplied to the alternating current output terminals 11 as indicated by the broken arrows. The subsequent alternations in the current of the output circuits are of course a repetition of those just described.

It has been found convenient to connect the capacitor 26 across the load in parallel with the transformer through which potential is applied to the grids of the valves. When such a transformer is operated near saturation it has been found that the arrangement is equivalent to a parallel circuit including a reactor and a capacitor and having an impedance that varies so that the load power factor is either leading or at least unity, thus insuring the stability of the circuit inasmuch as the grid voltage should lag behind the valve current when the load is varied. With this arrangement, it is possible to obtain a drooping or flat frequency characteristic as the load is increased. At low loads the transformer is saturated and both ends of the voltage waves controlling the grids of the valves are curved downward so that each valve is allowed to start earlier while the other is operating and the frequency is comparatively high. When the load is increased, the saturation tends to decrease due to the decrease in voltage, both ends of the voltage wave controlling the grids tend to straighten out so that the starting of the valves is delayed, and the frequency is reduced or maintained constant as desired. Excellent voltage regulation is realized during the operation of the apparatus. At zero loads or light loads the saturation of the transformer is high and the current absorbed by the capacitor 26 is comparatively high. This creates a high voltage drop in the circuit. When the load goes up the load voltage drops down so that the saturation of the transformer is reduced and the capacity current goes down with it. The result is that the voltage drop due to that current is also reduced and the change in load voltage is improved.

The valves 15 and 16 may be of any suitable type, such as glow discharge device, a device in which ionization of a gas is produced or a device in which current is conducted solely by means of electrons. In the arrangements illustrated by Figs. 1, 2 and 3, the grid potentials of the valves 15 and 16 are derived from resistors connected in the oscillatory circuit. In order to produce negative bias potentials of larger magnitude than those produced in the resistors 19 and 20, potential transformers may be connected between the resistors and the grids. As explained in the aforesaid copending application, both the grid potentials and the main transformer primary potentials may be derived from other parts of the circuit than those from which they are derived in the illustrated embodiments of the apparatus.

What I claim as new and desire to secure by Letters Patent of the United States, is:

1. The combination of a pair of direct current circuit terminals, a pair of capacitance devices connected between said terminals, a pair of inductive windings, an electrical valve arranged to be connected in shunt to one of said capacitance devices through one of said inductive windings, an electrical valve arranged to be connected in shunt to the other of said capacitance devices through the other of said inductive windings, means including alternating current circuit terminals connected in circuit with said valves, and capacitance means connected between said valves independently of said alternating circuit terminals.

2. The combination of a pair of direct current circuit terminals, a pair of capacitance devices connected between said terminals, a pair of inductive windings inductively related to one another, an electrical valve arranged to be connected in shunt to one of said capacitance devices through one of said inductive windings, an electrical valve arranged to be connected in shunt to the other of said capacitance devices through the other of said inductive windings, and means including alternating current circuit terminals connected in circuit with said valves.

3. The combination of a pair* of electric valves each provided with a gird for controlling the current transmitted between its cathode and anode, a pair of capacitance devices connected respectively between the anodes of said valves and between the cathodes of said valves, an inductive winding connected between the cathode of one of said valves and the anode of the other of said valves, a pair of direct current circuit terminals, means for connecting one of said terminals to one of said valves and one of said capacitance devices, and means including an inductive winding for connecting the other of said terminals to the other of said valves.

4. The combination of a pair of electric valves each provided with a grid for controlling the current transmitted between its cathode and anode, a pair of capacitance devices connected respectively between the anodes of said valves and between the cathodes of said valves, an inductive winding connected between the cathode of one of said valves and the anode of the other of said valves, a pair of direct current circuit terminals, means for connecting one of said terminals to one of said valves and one of said capacitance devices, means including an inductive winding for connecting the other of said terminals to the other of said valves, alternating current circuit terminals connected in circuit with said valves, and means for subjecting said grids to control potentials dependent on the power transmitted between said alternating and direct current circuit terminals.

5. The combination of a pair of electric valves each provided with a grid for controlling the current transmitted between its cathode and an anode, a capacitance device, a pair of direct current circuit terminals, means for connecting one of said terminals to the anode of one of said valves and to one terminal of said capacitance device, means including an inductive winding for connecting the other of said terminals to the cathode of the other of said valves, means including an inductive winding for connecting the cathode of one of said valves to the other terminal of said capacitance device and to the anode of the other of said valves, alternating current circuit terminals connected in circuit with said valves, and means connected in series with said inductive windings for controlling the potentials of said grids.

6. In a system for transmitting energy between a direct current circuit and an alternating current circuit, the combination of a pair of capacitance devices connected across the direct current circuit, a circuit including an electrical valve connected in shunt to each of of said capacitance devices, said alternating current circuit being associated with both of said valve circuits, and means connected in both of said valve circuits to substantially suppress any short circuit current due to the failure of either valve.

7. In a system for transmitting energy between a direct current circuit and an alternating current circuit, the combination of a pair of capacitance devices connected across the direct current circuit, a circuit including an electrical valve connected in shunt to each of said capacitance devices, said alternating current circuit being associated with both of said valve circuits, and an inductive winding in each of said valve circuits inductively related to substantially suppress any short circuit current due to the failure of either valve.

In witness whereof, I have hereunto set my hand this 5th day of July, 1929.

CAMIL A. SABBAH.